United States Patent
Balasubramanian et al.

(10) Patent No.: US 10,310,899 B2
(45) Date of Patent: Jun. 4, 2019

(54) DATABASE AND A DEVELOPMENT PROJECT SYSTEM, METHOD, AND RECORDING MEDIUM

(71) Applicant: International Business Machines Corporation, Armonk, NY (US)

(72) Inventors: Swaminathan Balasubramanian, Troy, MI (US); Kenneth Wayne Roberson, North Richland Hills, TX (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 15/056,637

(22) Filed: Feb. 29, 2016

(65) Prior Publication Data
US 2017/0249142 A1    Aug. 31, 2017

(51) Int. Cl.
*G06F 9/44*    (2018.01)
*G06F 9/50*    (2006.01)
*G06F 16/20*    (2019.01)
*G06Q 30/02*    (2012.01)
*G06F 16/21*    (2019.01)

(52) U.S. Cl.
CPC ............ *G06F 9/5005* (2013.01); *G06F 16/20* (2019.01); *G06F 16/21* (2019.01); *G06Q 30/0209* (2013.01)

(58) Field of Classification Search
CPC ....................................................... G06F 8/70
See application file for complete search history.

(56) References Cited

U.S. PATENT DOCUMENTS

| | | | |
|---|---|---|---|
| 8,645,906 B2 | 2/2014 | Jain et al. | |
| 8,683,473 B2 | 3/2014 | Maresh et al. | |
| 2005/0216328 A1* | 9/2005 | Clark | G06Q 10/0631 705/7.13 |
| 2008/0255919 A1* | 10/2008 | Gorder | G06Q 10/06 705/7.13 |
| 2009/0125359 A1 | 5/2009 | Knapic et al. | |
| 2012/0304187 A1* | 11/2012 | Maresh | G06Q 10/1093 718/103 |
| 2015/0324190 A1* | 11/2015 | Ledbrook | G06Q 10/0631 717/101 |

OTHER PUBLICATIONS

Jessop (Web article: Changing task dependencies, dated Jul. 1, 2009, retrieved on Feb. 13, 2018, URL:http://www.projectlearning.net/pdf/E2_1.pdf).*

* cited by examiner

*Primary Examiner* — Hang Pan
(74) *Attorney, Agent, or Firm* — Kurt P. Goudy, Esq.; McGinn IP Law Group, PLLC

(57) ABSTRACT

A development project method, system, and non-transitory computer readable medium, include a classification circuit configured to classify tasks of a project into a first capability-type executed by a first project development strategy and a second capability-type executed by a second project development strategy, a switch point calculation circuit configured to calculate a switch point based on values stored in the database, the switch point being a time during the project when project development switches between the first project development strategy and the second project development strategy.

19 Claims, 6 Drawing Sheets

DATABASE AND A DEVELOPMENT PROJECT SYSTEM, METHOD, AND RECORDING MEDIUM

BACKGROUND

The present invention relates generally to a development project system, and more particularly, but not by way of limitation, to a database and optimizing a switch between types of development in a development project system using the database.

In development projects, there can be sub-system development and capability-focused development. Sub-system (or "Silo")-focused development is where development teams are formed and assigned to each sub-system. Then, for each capability to be delivered, the associated sub-systems are identified and tasks assigned to each silo development team.

Capability-focused development is where development teams are formed aligned to requested capabilities that may cross-cut (e.g., flow through) sub-systems. In this case, multiple teams may work on a single sub-system.

However, there is a technical problem in the art in that the sub-system-based approach and the formation of a 'silo' mentality affects overall productivity over time in that projects spend too long on the foundational capabilities of a project and the capability-focused development affects the quality of the sub-systems, especially the underpinning frameworks, suffer due to splintered development. That is, a technical problem arises in that a switch point between developments strategies is not optimal and the overall project development is not efficient due to spending too much (or too little) time on either the sub-system-focused development or the capability-focused development.

SUMMARY

In an exemplary embodiment, the present invention can provide a development project system including a database, including a classification circuit configured to classify tasks of a project into a first capability-type executed by a first project development strategy and a second capability-type executed by a second project development strategy, and a switch point calculation circuit configured to calculate a switch point based on values stored in the database, the switch point being a time during the project when project development switches between the first project development strategy and the second project development strategy.

Further, in another exemplary embodiment, the present invention can provide a non-transitory computer-readable recording medium recording a development project program, the program causing a computer to perform: reading values from a database, classifying tasks of a project in a first-capability type executed by a first project development strategy and a second capability-type executed by a second project development strategy, and calculating a switch point based on the values read from the database, the switch point being a time during the project when project development switches between the first project development strategy and the second project development strategy.

Even further, in another exemplary embodiment, the present invention can provide a development project method, including reading values from a database, classifying tasks of a project in a first capability-type executed by a first project development strategy and a second capability-type executed by a second project development strategy, and calculating a switch point based on the values read from the database, the switch point being a time during the project when project development switches between the first project development strategy and the second project development strategy.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
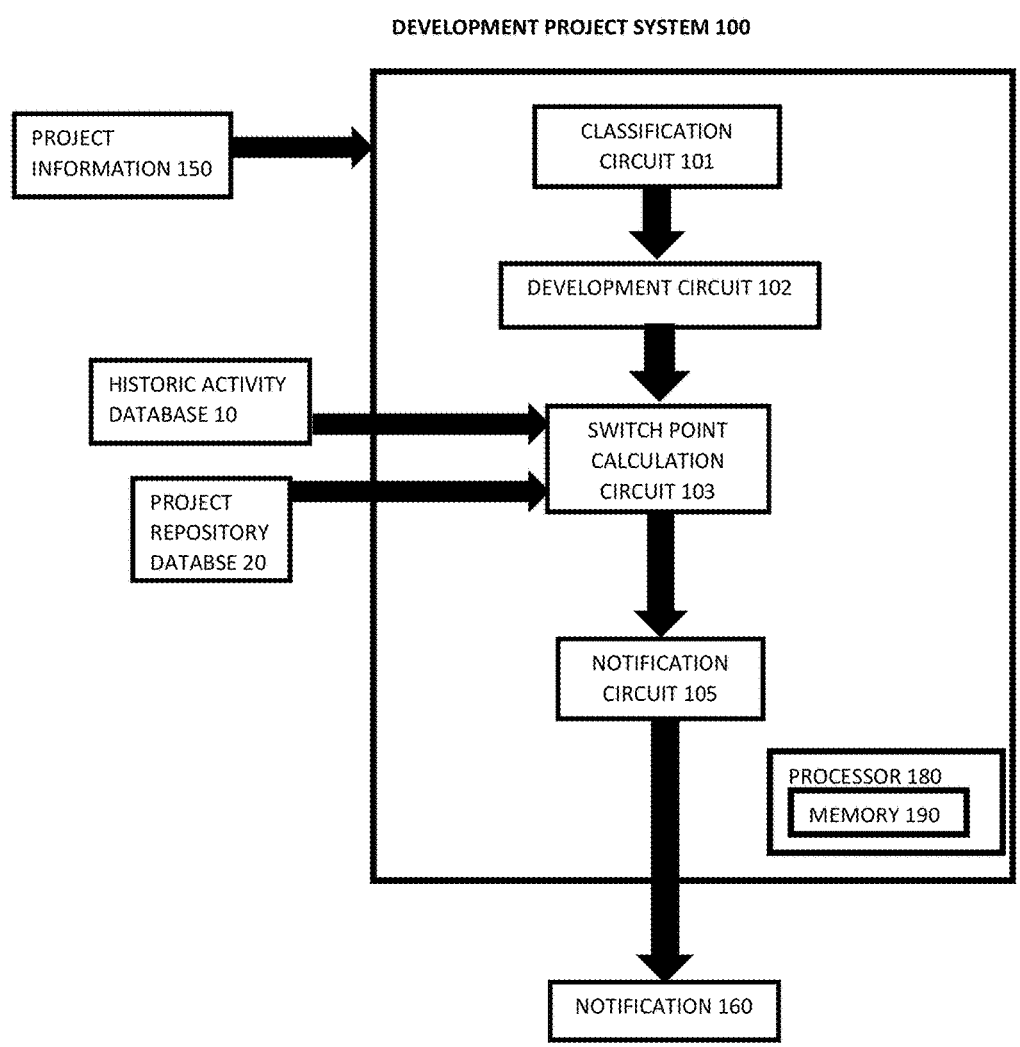
FIG. 1 exemplarily shows a block diagram illustrating a configuration of a development project system 100.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the development project system 100 includes a classification circuit 101, a development circuit 102, a switch point calculation circuit 103, and a notification circuit 105. The development project system 100 includes a processor 180 and a memory 190, with the memory 190 storing instructions to cause the processor 180 to execute each circuit of development project system 100.

The processor and memory may be physical hardware components, or a combination of hardware and software components.

Although the development project system 100 includes various circuits, it should be noted that the development project system 100 can include modules in which the memory 190 stores instructions to cause the processor 180 to execute each module of development project system 100. That is, the circuits can include a processing component.

Also, each circuit can be a stand-alone circuit, device unit, etc. that can be interconnected to cooperatively produce a transformation to a result.

With the use of these various circuits, the development project system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space, etc.) within a lower-dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower-dimensional feature space, is used to identify the emergence of a certain cognitive states over that period of time. One or more preferred embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

Figure 4:
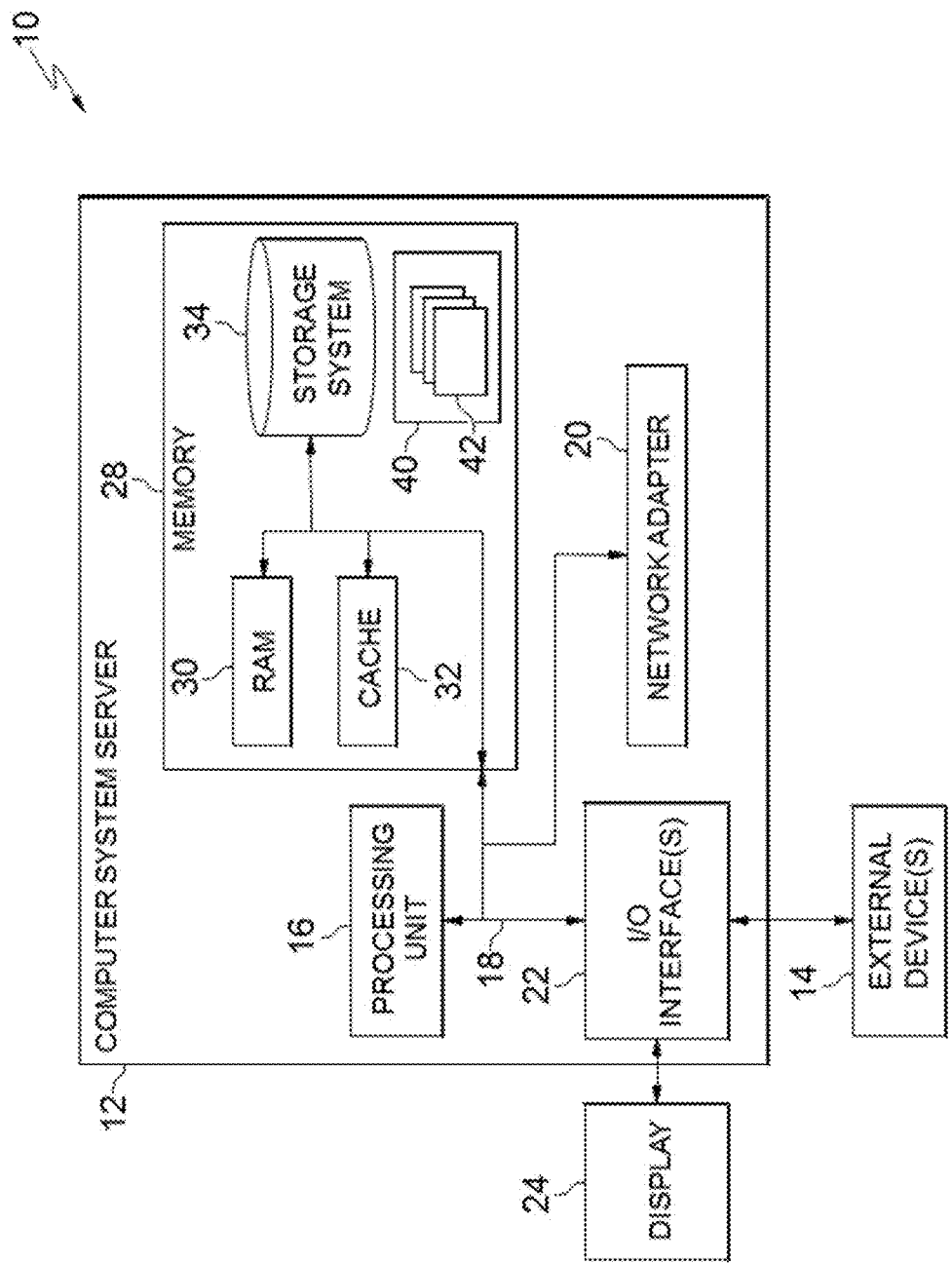
FIG. 4 depicts a cloud computing node 10 according to an embodiment of the present invention.
Figure 5:
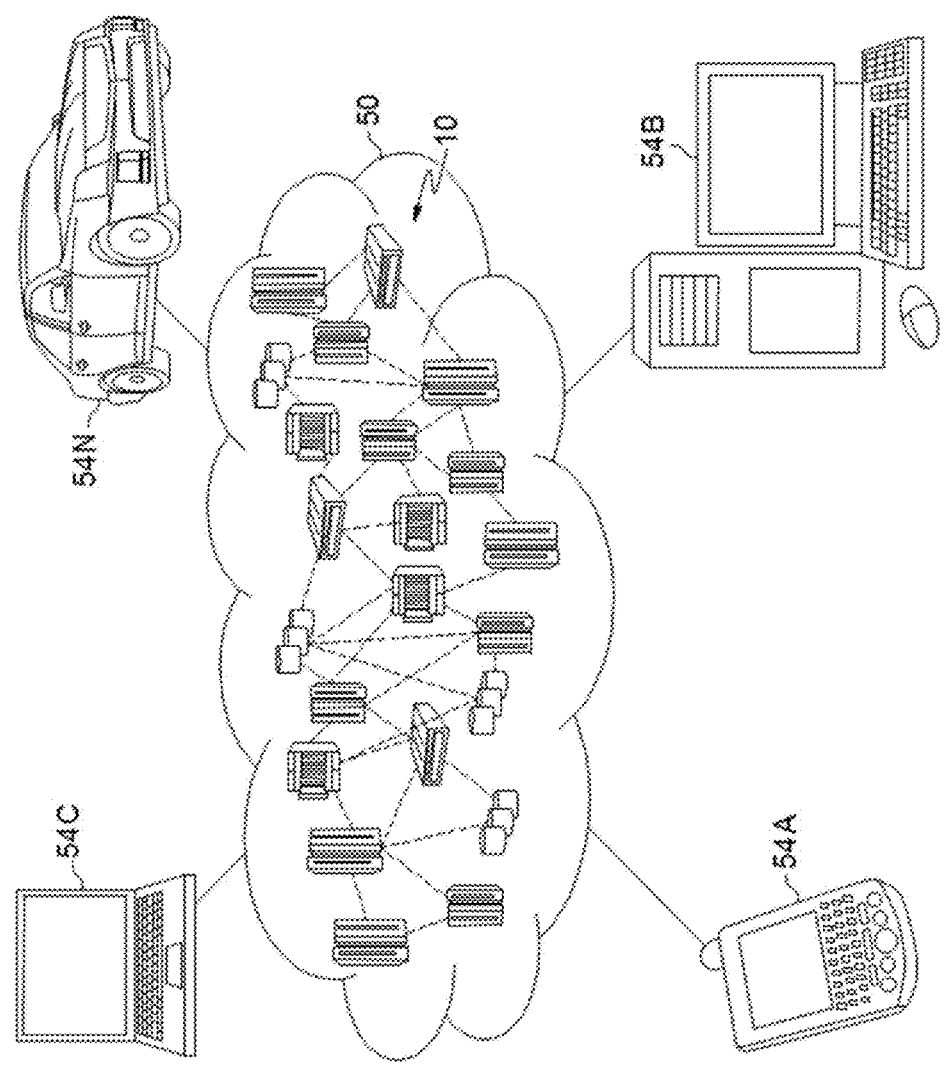
FIG. 5 depicts a cloud computing environment 50 according to another embodiment of the present invention.
Figure 6:
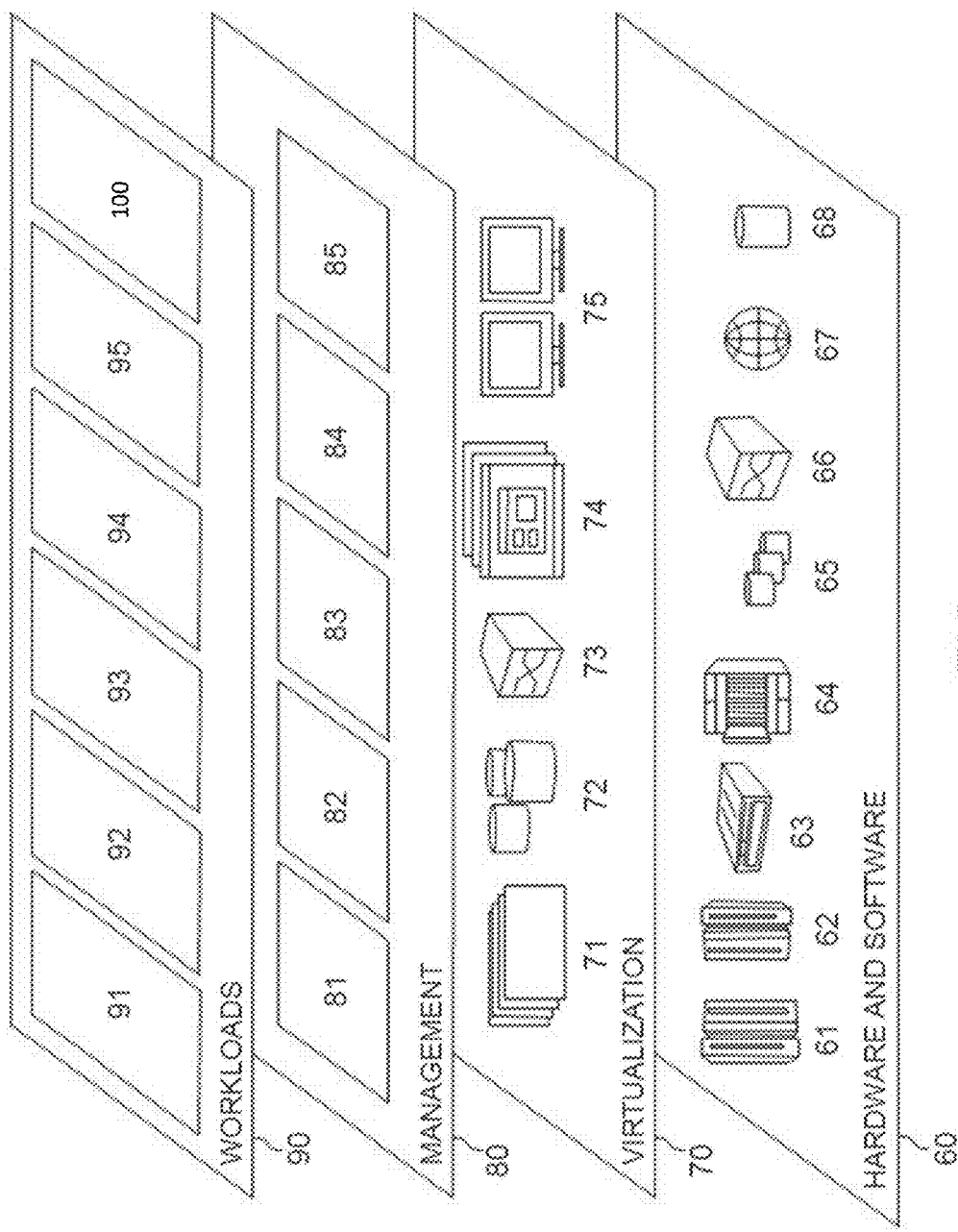
FIG. 6 depicts abstraction model layers according to yet another embodiment of the present invention.

Although as shown in FIGS. 4-6 and as described later, the computer system/server 12 is exemplarily shown in cloud computing node 10 as a general-purpose computing circuit which may execute in a layer the development project system 100 (FIG. 6), it is noted that the present invention can be implemented outside of the cloud environment.

The development project system 100 receives project information 150. The project information 150 includes, but is not limited to, detailed information relationships and/or interdependence between task/sub-tasks (i.e., tasks, sub-tasks, resources, time constraints, parameters, etc.) about each task to be performed in order to complete the development of the project.

Based on the project information 150, the classification circuit 101 classifies the tasks by labeling the tasks with a designation of whether a part of the project is a foundational capability or an enhancement capability. A foundational capability can be delivered using sub-system-focused development, and whereas an enhancement capability can be delivered using capability-focused development.

For example, a foundational capability can include a web-base type code to display a webpage. An example of an enhancement capability can be a spreadsheet used to populate the display on the webpage. That is, the web base code would need to be completed to a certain extent before the spreadsheet could be based on the web base code.

It is noted that each task in the project information 150 can be input into the development project system 100 with a unique identifier given during the analysis and design phase of the project labeling the task as either a foundational capability or an enhancement capability. In this manner, the classification circuit 101 can read the unique identifier and classify the task based on the unique identifier.

The development circuit 102 develops a sequence to start with all the tasks classified as foundational capabilities by the classification circuit 101 such that the foundational capabilities are delivered using a sub-system-focused development.

Sub-system (or "Silo")-focused development is where development teams are formed and assigned to each sub-system. Then, for each foundational capability to be delivered, the associated sub-systems are identified and tasks assigned to each silo development team.

The switch point calculation circuit 103 calculates a switch point. The switch point is the optimal point in project development when the entire development will switch over from the sub-system-focused development to a capability-focused development.

Capability-focused development is where development teams are formed aligned to requested capabilities that may cross-cut sub-systems. In this case, multiple teams may work on a single sub-system.

It is noted that the description herein relates generally to a switch point between a first project development system and a second project development system, but is not limited thereto. That is, there can be a plurality of project developments systems layered such that multiple switch points are calculated to switch between each layer as the project progresses.

Figure 2:
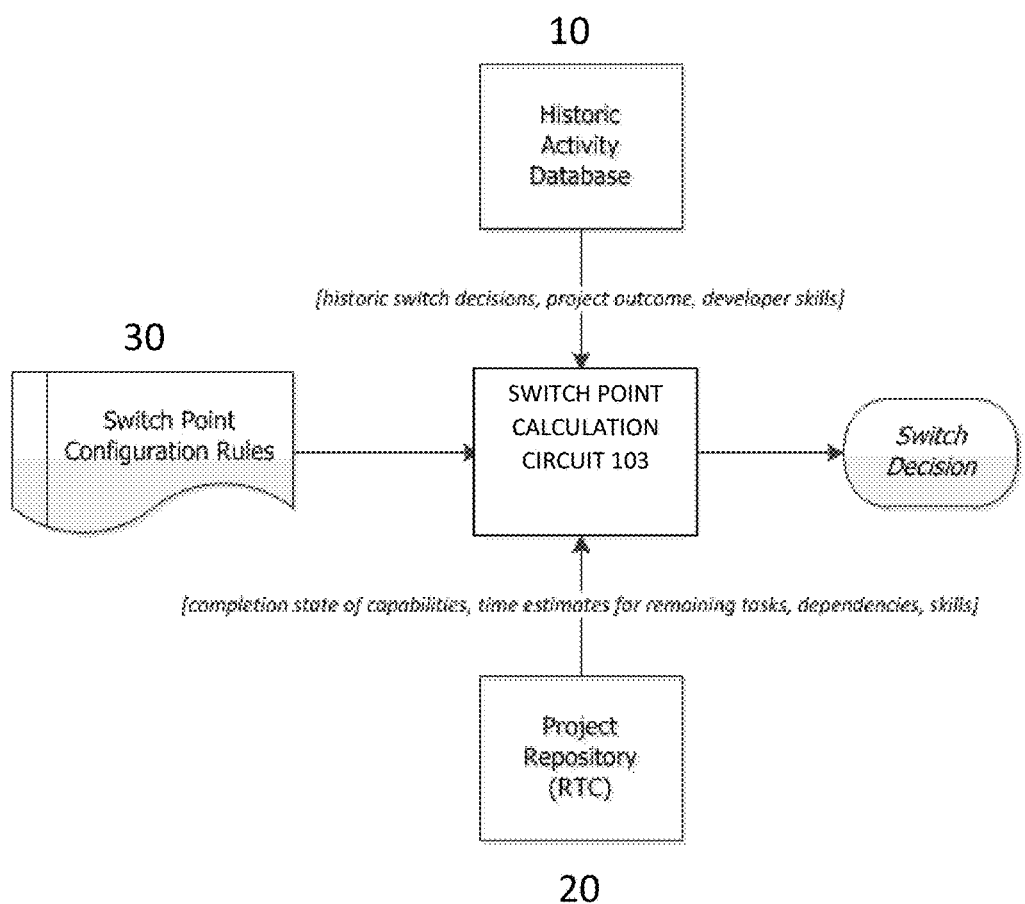
FIG. 2 exemplarily shows inputs to a switch point calculation circuit 103.

FIG. 2 exemplarily shows factors in which the switch point calculation circuit 103 uses to calculate a switch point (i.e., switch decision). Switch point configuration rules 30 are pre-programmed into the switch point calculation circuit 103. The switch point configuration rules may be specified as a Boolean expression such as (capability1@75% AND capability2@100% AND (capability3@50% OR capability4@75%)). In this exemplary switch point configuration rule, the expression is interpreted as 75% completion of capability1 AND 100% completion of capability2 AND either 50% of capability3 or 75% of capability4. "Capability1", "capability2", "capability3", and "capability4" are each foundational capabilities being developed in the sub-system-focused development.

The switch point calculation circuit 103 also receives data from a historic database 10 to calculate the switch point. The data input from the historic database 10 can include, but is not limited to, historic switch decisions from past projects, project outcomes based on prior switch decisions, developer skills, etc.

The switch point calculation circuit 103 further receives data from a project repository 20. The data input from the project repository 20 can include, but is not limited to, a percentage of foundational or core functions versus enhancements to be developed, a completion state of the foundational capabilities, an estimated time for further development efforts or an estimated time for completion of the foundational capabilities, dependencies such as intra-core functions as well as between foundational functions and enhancement functions, and/or a skill or availability of resources (i.e., allocate 5 people vs 500 people).

It is noted that the switch point calculation circuit 103 bases a switch decision based on the switch point configuration rules 30, the data of the historic activity database 10, and the data of the project repository 20, either collectively or individually.

Based on each of the inputs into the switch point calculation circuit 103, the switch point calculation circuit 103 calculates the switch point in accordance with a predetermined algorithm An exemplary regression algorithm can be any of "Methodology1_Active_True", "Methodology2_Active_True", and "Methodology3_Active_True", as shown below.

$$\text{Methodology1\_Active\_True} = (a1*(\% \text{ of capability } 1) + b1*(\% \text{ of capability } 2) + c1*(\text{employee\_skill\_level}) + d1*(\% \text{ time left in the project})) < 1 \quad \text{ALGORITHM 1}$$

$$\text{Methodology2\_Active\_True} = (a3*(\% \text{ of capability } 1) + b3*(\% \text{ of capability } 2) + c3*(\text{employee\_skill\_level}) + d3*(\% \text{ time left in the project})) > 1 \quad \text{ALGORITHM 2}$$

$$\text{Methodology3\_Active\_True} = a2*(\% \text{ of capability } 3) + b2*(\% \text{ of capability } 2) + c2*(\text{employee\_skill\_level}) + d2*(\% \text{ time left in the project}) > 2 \quad \text{ALGORITHM 3}$$

It is important to note that the algorithm used by the switch point calculation circuit 103 can vary based on the combination of the switch point configuration rules 30, the data of the historic activity database 10, and data of the project repository 20 are used in the algorithm are each present individually or in combination.

That is, the algorithm employed by the switch point calculation circuit 103 continuously monitors the above factors of the project repository 20 and the historic activity database 10 and outputs an optimal time for the switch point the development methodology (i.e., to switch between the sub-system (or "Silo")-focused development and the capability-focused development).

Based on the calculated switch point by the switch point calculation circuit 103, the notification circuit 105 outputs a notification notifying that the switch point has been reached such that the project can be switched between the sub-system (or "Silo")-focused development and the capability-focused development. The notification circuit 105 can also issue the notification 160 if the switch point is trending to be reached (i.e., getting closer to where the project development currently is at). For example, if project is 50% of the way to the switch point, 10% away from the switch point, 30% away from the switch point, or any predetermined percentage away from the switch point, the notification 160 will be issued by the notification circuit.

Figure 3:
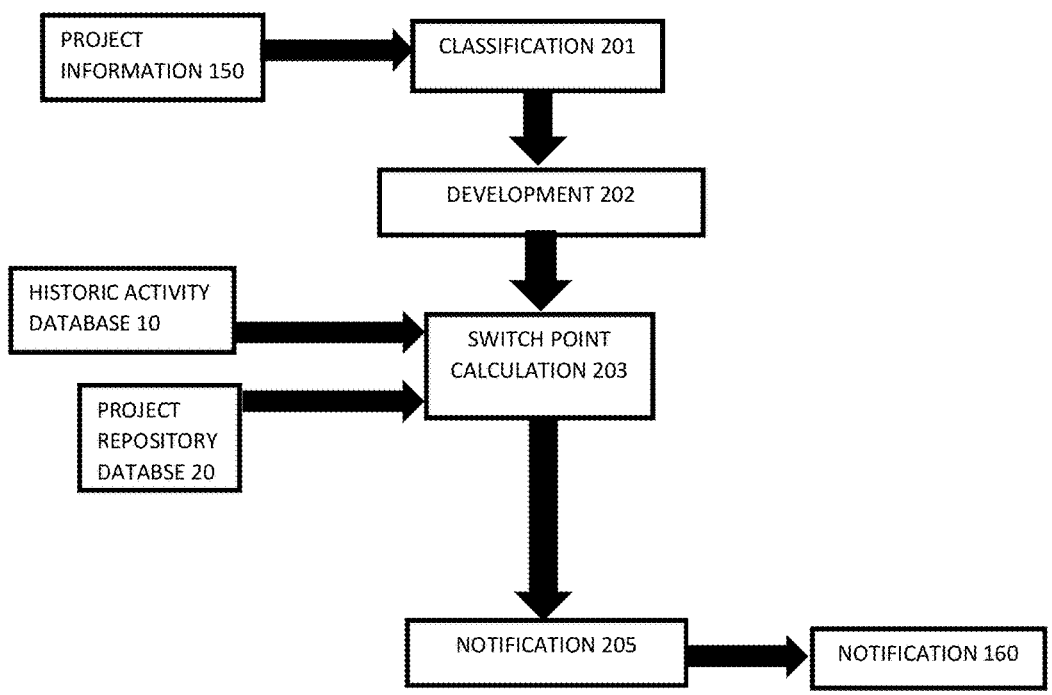
FIG. 3 exemplarily shows a high level flow chart for a development project method 200.

FIG. 3 shows a high level flow chart for a method 200 of development project.

Based on the project information 150, Step 201 classifies the tasks by labeling the tasks with a designation of whether a part of the project is a foundational capability or an enhancement capability.

Step 202 develops a sequence to start with all the tasks classified as foundational capabilities by Step 201 such that the foundational capabilities are delivered using a sub-system focused development.

Step 203 calculates a switch point based on a variety of factors discussed above. The switch point is the optimal point in project development when the entire development will switch over from the sub-system-focused development to a capability-focused development.

Based on the calculated switch point by Step 203, Step 204 outputs a notification notifying that the switch point has been reached such that the project can be switched between the sub-system (or "Silo")-focused development and the capability-focused development.

Based on the above configuration of the embodiments, the development project system 100 enables optimal production of a project. That is, the development project system 100 enables a team to switch between foundational project tasks and functional project tasks that build on the foundational tasks at a most efficient point (i.e., the switch point).

It is noted that the development project system 100 is described generally relating to computer software, but is not limited thereto. The development project system 100 can be utilized for any type of project to increase efficiency. For example, the development project system 100 could be applied to a home building project in which the development project system 100 calculated the switch point between laying the foundation of the home, installing frame lumber, electrical lines, roofing, plumbing, interior design, etc. That is, there is a point when the previous foundational task is completed sufficiently such that the next enhancement task can take place and cause the project to be completed sooner and/or more efficiently.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 4, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the development project system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A development project system including a database, comprising:
    a classification circuit configured to classify tasks of a project into a first capability-type including a foundational capability for the project executed by a first project development strategy and a second capability-type including an enhancement capability for the project executed by a second project development strategy, the foundational capability being a back-end layer for providing a functionality for the enhancement capability for the project to function;

a switch point calculation circuit configured to calculate a switch point based on values stored in the database, the switch point being a time during the project when project development switches between the first project development strategy and the second project development strategy; and a project repository database including values for at least one of a percentage of the tasks for the first project development strategy relative to the second project development strategy to be developed, a completion state of the first capability-type tasks, an estimated time for completion of the first capability-type tasks, dependencies between the first capability-type tasks and the second capability-type tasks, and availability of resources;

wherein the switch point calculation circuit includes a plurality of predefined switch point configuration rules set according to a percentage of a completion of the first project development strategy less than a 100% completion at which a necessary dependency of the dependencies for the second project development strategy to begin between the first capability-type tasks and the second capability-type tasks is completed such that the second project development strategy can begin, the switch point calculation circuit calculating the switch point based on the switch point configuration rules and the values stored in the database, wherein the foundational capability is delivered using a sub-system-focused development and the enhancement capability is delivered using a capability-focused development where the capability-focused development is dependent on the percentage of the completion of the first project development strategy less than the 100% completion for the capability-focused development to begin, wherein a switch between the first project development strategy and the second project development strategy is executed when the switch point occurs, wherein the foundational capability comprises a web-base type code to display a webpage, wherein the enhancement capability comprises a spreadsheet used to populate the display on the webpage, and wherein a completion of the web-base type code is required prior to beginning design of the spreadsheet.

2. The system of claim 1, further comprising a development circuit configured to develop a sequence of performing the tasks in the first capability-type as classified by the classification circuit such that the first project development strategy executes the tasks in the first capability-type.

3. The system of claim 1, further comprising a notification circuit configured to send a notification indicating that the switch point has been reached in the project development.

4. The system of claim 1, further comprising a notification circuit configured to send a notification indicating that the switch point is approaching in the project development.

5. The system of claim 1, wherein the database further comprises:

a historic activity database including values for at least one of a historic switch point from a prior project, a project outcome based on a prior switch point calculation, and developer skills assigned to the project.

6. The system of claim 5, wherein the switch point calculation circuit is configured to calculate the switch point based on values from at least one of the historic activity database and the project repository database.

7. The system of claim 1, wherein the classification circuit classifies tasks of the project into a third capability-type executed by a third project development strategy, and wherein the switch point calculation circuit calculates a second switch point for when the project development strategy is switched between the second project development strategy and the third project development strategy.

8. The system of claim 1, wherein a percentage of the tasks of the first project development strategy must be completed prior to the switch point.

9. The system of claim 1, wherein the classification circuit classifies the tasks according to a human resource requirement for the tasks and a computing requirement for the tasks.

10. A non-transitory computer-readable recording medium recording a development project program, the program causing a computer to perform:

reading values from a database;

classifying tasks of a project into a first capability-type including a foundational capability for the project executed by a first project development strategy and a second capability-type including an enhancement capability for the project executed by a second project development strategy, the foundational capability being a back-end layer for providing a functionality for the enhancement capability for the project to function; and calculating a switch point based on the values read from the database, the switch point being a time during the project when project development switches between the first project development strategy and the second project development strategy, wherein the database comprises a project repository database including values for at least one of a percentage of the tasks for the first project development strategy relative to the second project development strategy to be developed, a completion state of the first capability-type tasks, an estimated time for completion of the first capability-type tasks, dependencies between the first capability-type tasks and the second capability-type tasks, and availability of resources, wherein the calculating calculates the switch point based on a plurality of predefined switch point configuration rules set according to a percentage of a completion of the first project development strategy less than a 100% completion at which a necessary dependency of the dependencies for the second project development strategy to begin between the first capability-type tasks and the second capability-type tasks is completed such that the second project development strategy can begin, and the values stored in the database, wherein the foundational capability is delivered using a sub-system-focused development and the enhancement capability is delivered using a capability-focused development where the capability-focused development is dependent on the percentage of the completion of the first project development strategy less than the 100% completion for the capability-focused development to begin, wherein a switch between the first project development strategy and the second project development strategy is executed when the switch point occurs, wherein the foundational capability comprises a web-base type code to display a webpage, wherein the enhancement capability comprises a spreadsheet used to populate the display on the webpage, and wherein a completion of the web-base type code is required prior to beginning design of the spreadsheet.

11. The non-transitory computer-readable recording medium of claim 10, further comprising developing a sequence of performing the tasks in the first capability-type as classified by the classifying such that the first project development strategy executes the tasks in the first capability-type.

12. The non-transitory computer-readable recording medium of claim 10, further comprising sending a notification indicating that the switch point has been reached in the project development.

13. The non-transitory computer-readable recording medium of claim 10, further comprising sending a notification indicating that the switch point is approaching in the project development.

14. The non-transitory computer-readable recording medium of claim 10, wherein the database further comprises:
a historic activity database including values for at least one of a historic switch point from a prior project, a project outcome based on a prior switch point calculation, and developer skills assigned to the project.

15. A development project method, comprising:
reading values from a database;
classifying tasks of a project into a first capability-type including a foundational capability for the project executed by a first project development strategy and a second capability-type including an enhancement capability for the project executed by a second project development strategy, the foundational capability being a back-end layer for providing a functionality for the enhancement capability for the project to function; and
calculating a switch point based on the values read from the database, the switch point being a time during the project when project development switches between the first project development strategy and the second project development strategy,
wherein the database comprises a project repository database including values for at least one of a percentage of the tasks for the first project development strategy relative to the second project development strategy to be developed, a completion state of the first capability-type tasks, an estimated time for completion of the first capability-type tasks, dependencies between the first capability-type tasks and the second capability-type tasks, and availability of resources,
wherein the calculating calculates the switch point based on a plurality of predefined switch point configuration rules set according to a percentage of a completion of the first project development strategy less than a 100% completion at which a necessary dependency of the dependencies for the second project development strategy to begin between the first capability-type tasks and the second capability-type tasks is completed such that the second project development strategy can begin, and the values stored in the database,
wherein the foundational capability is delivered using a sub-system-focused development and the enhancement capability is delivered using a capability-focused development where the capability-focused development is dependent on the percentage of the completion of the first project development strategy less than the 100% completion for the capability-focused development to begin,
wherein a switch between the first project development strategy and the second project development strategy is executed then the switch point occurs,
wherein the foundational capability comprises a web-base type code to display a webpage,
wherein the enhancement capability comprises a spreadsheet used to populate the display on the webpage, and
wherein a completion of the web-base type code is required prior to beginning design of the spreadsheet.

16. The method of claim 15, further comprising developing a sequence of performing the tasks in the first capability-type as classified by the classifying such that the first project development strategy executes the tasks in the first capability-type.

17. The method of claim 15, further comprising sending a notification indicating that the switch point has been reached in the project development.

18. The method of claim 15, further comprising sending a notification indicating that the switch point is approaching in the project development.

19. The method of claim 15, wherein the database further comprises:
a historic activity database including values for at least one of a historic switch point from a prior project, a project outcome based on a prior switch point calculation, and developer skills assigned to the project.

* * * * *